United States Patent Office 2,966,141
Patented Dec. 27, 1960

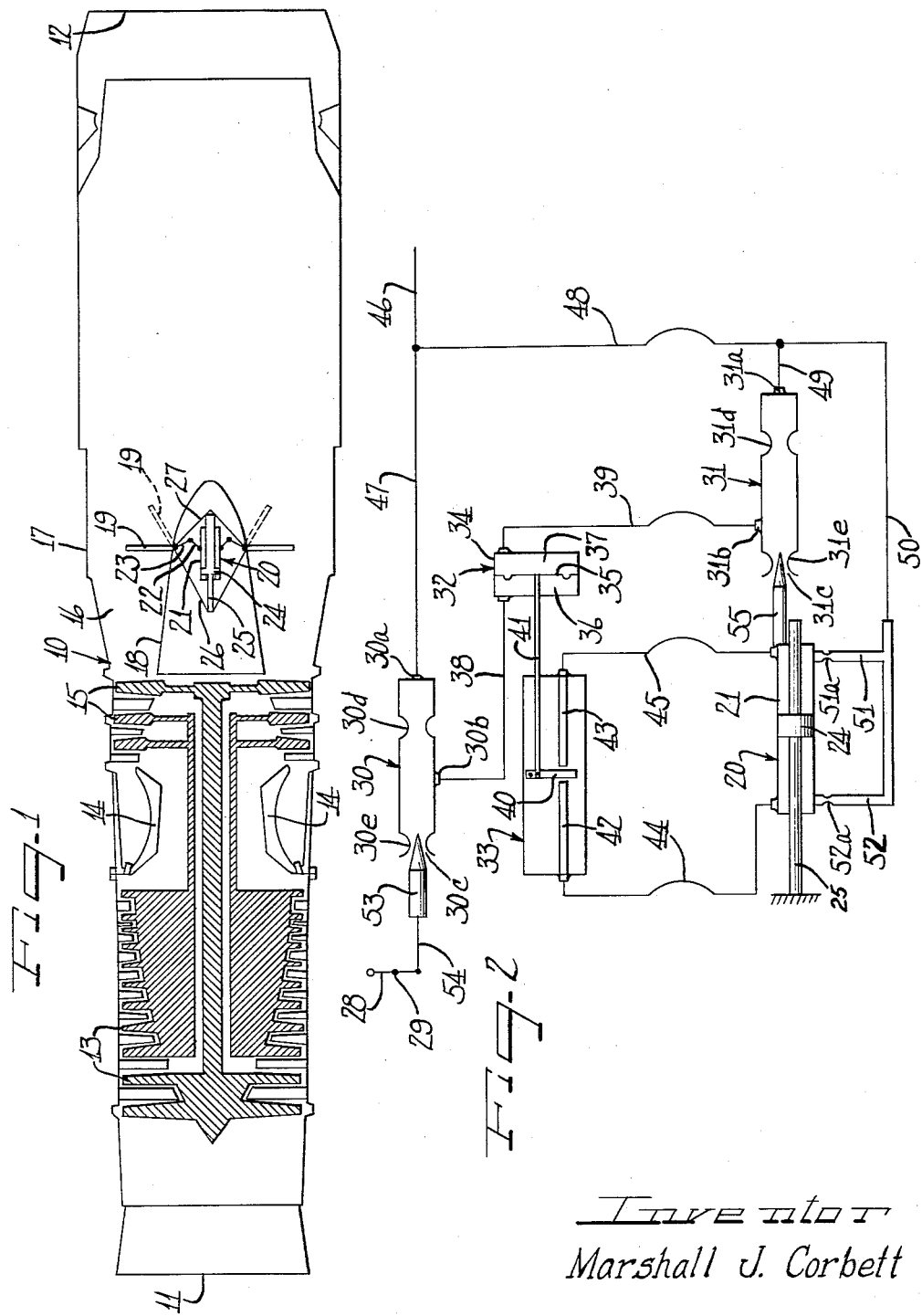

2,966,141
PNEUMATIC DISPLACEMENT AMPLIFIER

Marshall J. Corbett, Mayfair Heights, Ohio, assignor to Thompson Ramo Wooldridge Inc., a corporation of Ohio Filed July 3, 1956, Ser. No. 595,736

3 Claims. (Cl. 121—41)

This invention relates in general to a remote control device, and more particularly to a pneumatic displacement amplifier especially useful in connection with jet engine controls, although other uses and purposes may be apparent to one skilled in the art.

By way of specific example, the instant invention is highly desirable for use in a jet engine equipped with an afterburner umbrella spraybar arrangement, wherein the position of the spraybars are remotely controlled by the pneumatic displacement amplifier of the present invention in order to vary the fuel distribution according to the amount of thrust augmentation desired.

In the present invention, a pair of pneumatic potential dividers are provided each of which includes an input port, an output port, and a bleed-off port, wherein the input and output ports are separated by a fixed orifice and the output port and the bleed-off port are separated by a variable orifice. The output ports are connected to opposite sides of a force balance device which takes the form of a pressure responsive diaphragm. Mechanically connected to the diaphragm is a pilot valve which is pneumatically connected to an air actuator having an actuating piston. The input ports of the potential dividers and the opposite sides of the actuator piston are pneumatically connected to the compressor discharge of the jet engine. The actuator is operatively connected to the variable orifice of one of the potential dividers, while mechanical linkages operatively connect the throttle lever of the engine with the other potential divider. Variation in the effective area of the variable orifice associated with the throttle lever causes a variation in the pressure at the output port of the corresponding potential divider, which, in turn, results in unbalance of the force balance device. Unbalance of the force balance device mechanically adjusts the pilot valve of bleed air from one side of the actuator piston and causes actuation thereof for relatively adjusting the position of the spraybars in the afterburner. Movement continues until variation in the variable orifice of the potential divider associated with the air actuator effects a similar balance with respect to the force balance device and equilibrium is reached.

Accordingly, it is an object of this invention to provide a remote control device especially useful in connection with jet engines.

Another object of this invention is in the provision of pneumatic displacement amplifier capable of remotely operating an air actuator.

A further object of this invention resides in the provision of a pneumatic displacement amplifier for use in remotely operating an umbrella spraybar arrangement in the afterburner of a jet engine.

A still further object of this invention is to provide a pneumatic displacement amplifier capable of remotely controlling an air actuator which includes a pair of sonic orifice potential dividers one associated with the air actuator and the other associated with a control mechanism, a force balance device pneumatically connected to the potential dividers, a pilot valve mechanically connected to the force balance device and pneumatically connected to the air actuator, and a source of sonic air connected to the potential dividers and the air actuator.

Other objects, features, and advantages of the invention will be apparent from the following detailed disclosure, taken in conjunction with the accompanying sheets of drawings, wherein like reference numerals refer to like parts, in which:

On the drawings—

Figure 1 is an axial diagrammatic view, with some parts in section and other parts in elevation, of a jet engine equipped with the present invention as applied to the afterburner spraybar arrangement; and Figure 2 is a schematic view of the pneumatic displacement amplifier according to the invention.

As shown on the drawings:

Referring particularly to Figure 1, a typical jet engine 10 is illustrated which includes an intake nozzle 11 for receiving air from the atmosphere and a discharge nozzle 12 for expelling high temperature and high pressure gases generated by the engine which develop jet engine thrust. As the air passes through the engine it is compressed by multi-stage axial air flow compressors 13 which discharge high pressure compressed air into combustion chambers or cans 14. Fuel is fed to the combustion chamber 14 to mix with the compressed air and be ignited to discharge high temperature and high pressured gases into turbines 15. These gases expand through the turbines 15, the latter of which serve to drive the compressors 13, and enter an exhaust or afterburner chamber 16.

This afterburner chamber is defined by an outer shell or casing 17 of the jet engine and a tail cone 18 suitably suspended within the shell 17 thereby giving the afterburner chamber a toroidal shape. The expanding gases then are propulsion exhausted through the discharge nozzle 12 to provide thrust for the jet engine.

In order to increase the thrust forces and overall efficiency of the jet engine, additional fuel may be injected into the afterburner chamber 16 for additionally raising the pressure and temperature of the gases passing therethrough. In the instant case, a spraybar arrangement is provided, wherein a plurality of generally circumferentially spaced and radially extending spraybars 19 are pivotally mounted on the tail cone 18 in the area of the afterburner chamber 16. By varying the positions of the spraybars within the range of the spraybars shown in solid line and those shown in dotted lines, varying degrees of fuel distribution and thrust augmentation of the jet engine may be rendered.

In order to provide control of the movement of the spraybars 19, a fluid-operated actuator 20 which is a pneumatic or air actuator in the instant case, is suitably mounted within the tail cone 18. This actuator includes a housing or cylindrical casing 21 mechanically connected to the spraybars 19 through a link 22 pivotally connected at one end to the casing 21 and pivotally connected at the other end to an actuating lever 23 which is fixed to a spraybar at its pivot point. The actuator also includes a piston 24 slidably received within the casing 21 and having a stem or rod 25 extending from opposite ends and suitably fixed at opposite ends to stationary brackets 26 and 27. Obviously, the relatively movable parts of the air actuator may be arranged so that the piston 24 is stationarily mounted and the cylinder casing 21 is movably mounted and mechanically linked to the spraybars 19.

It may now be appreciated that a remote control is necessary for operating the air actuator 20, and for this purpose the pneumatic displacement amplifier of the present invention is provided for controlling the air actuator and positions of the spraybars. As shown in Figure 2, a control lever 28, such as the throttle lever of the jet engine is pivoted at 29 and operatively associated with the pneumatic displacement amplifier as is the air actuator 20.

This pneumatic displacement amplifier which is effectively a remote control device includes generally a pair of sonic orifice or pneumatic potential dividers, one being a throttle potential divider 30 and the other being an actuator potential divider 31, a force balance device 32, and a pilot valve 33, all of these components being interrelated and interconnected to operate together as a unit.

Each potential divider 30 and 31 includes respectively input ports 30a and 31a, output ports 30b and 31b, bleed-off ports 30c and 31c, fixed orifices 30d and 31d between the input and output ports, and variable orifices 30e and 31e between the output ports and the bleed-off ports.

The force balance device 32, in this instance, is pressure responsive, and includes a casing 34 having a diaphragm 35 carried therein which defines pressure chambers 36 and 37. Pressure chamber 36 is pneumatically connected to the output port 30b of the throttle potential actuator 30 through a suitable line 38, while pressure chamber 37 is pneumatically connected to the output port 31b of the actuator potential divider 31 by means of a suitable line 39.

Mechanically connected to the force balance device 32 is the pilot valve 33, wherein the pilot valve in this instance takes the form of a flutter valve for selectively bleeding air from opposite sides of the actuator piston 24. This pilot valve includes a pivotally mounted paddle or bar 40 which is mechanically connected to the diaphragm 35 of the force balance device 32 by means of a link 41. Bleed ports 42 and 43 are positioned on opposite sides of the throttle 40 and are respectively pneumatically connected to opposite sides of the actuator piston 24 through lines 44 and 45.

For operating the component parts, a source of pressurized fluid is necessary and in this case provided by a line 46 leading from the discharge of the compressors in the jet engine. Sonic fluid or air is thus supplied to the inlet ports of the potential dividers 30 and 31 by line 47, and lines 48 and 49, respectively. Similarly, sonic air is supplied to opposite sides of the air actuator piston 24 through lines 50, 51 and 52. Fixed orifices 51a and 52a are respectively provided in lines 51 and 52 leading to the opposite sides of the air actuator piston 24 in order to assure against bleeding of the entire system.

Variations in the area of the variable orifice 30e of the throttle potential divider 30 are obtained by movement of a tapered probe 53 concentric with the orifice which will vary the annular area created thereby. This probe is mechanically linked to the throttle lever 28 by a link 54. Similarly, variations in the area of the throttle orifice 31e of the actuator potential divider 31 are obtained through linear movement of a tapered probe 55 connected to the movable actuator casing 21 and concentric with the orifice which will vary the annular area created thereby.

In operation, sonic air is supplied to the potential divider and the air actuator. A desired change in the position of the throttle 28 results in a change through the associated linkage in the area of the variable orifice 30e of the throttle potential divider 30 which, in turn, results in a corresponding change in the output pressure of the potential divider which is fed to the force balance device through the line 38. The force balance device 32 compares this change in force rendered by the throttle potential divider output with the force rendered from the output of the actuator potential divider, wherein the pressure differential across the diaphragm 35 results in a corresponding position change of the control bar 40 in the pilot valve 33. This change in position of the pilot valve control bar 40 decreases the amount of air bled from one side of the actuator piston 24, while increasing the amount of air bled from the other side of the actuator piston 24 to lines 44 and 45, and ports 42 and 43. An unbalance of pressure is then established on opposite sides of the actuator piston 24 causing relative movement between the piston and the cylinder casing in corresponding direction, and adjustment of the spraybar position. The actuator casing 21 continues to move until the area of the variable orifice 31e of the actuator potential divider 31 is such as to cause its force resulting from its output pressure at the output port 31b to be in balance with the force resulting from the output of the throttle potential divider, thereby signalling the pilot valve 33 through the force balance device 32 and consequently the actuator to stop motion at the new desired position.

The spraybar position under varying loads will be maintained, wherein an undesired change in spraybar position due to an instantaneous change in drag or load results through the linkage 22 or 23 in a corresponding change in position of the actuator casing 21. This new position changes the area of the variable orifice 31e of the actuator potential divider 31, which change is reflected through the output port 31b to the force balance device 32. Then the force balance device 32 compares this change in the output of the actuator potential divider 31 with the output of the throttle potential divider 30 resulting in actuation of the diaphragm 35 and a corresponding position change of the pilot valve 33. This position change of the pilot valve 33 reflects a pressure differential across the actuator piston 24 and starts movement of the actuator casing 21 until the probe 55 coacting with the variable orifice 31e changes the area of this variable orifice so as to cause the output pressure from the actuator potential divider to signal a force to the force balance device 32 which is in balance with the force rendered by the output of the throttle potential divider and thereby signal the pilot valve and consequently the actuator to stop motion at the previously desired position. Thus, it is seen that this system acts in such a manner as to maintain equal forces on the opposite sides of the diaphragm and the force balance device 32.

While the instant invention has been described as applied to the positioning of spraybars in an afterburner of a jet engine, it will be appreciated that other uses and purposes may be apparent to one skilled in the art.

It will be understood that modifications and variations may be effected without departing from the scope of the novel concepts of the present invention, but it is understood that this application is to be limited only by the scope of the appended claims.

I claim as my invention:

1. A pneumatic displacement amplifier for controlling an air actuator having a piston therein by a remotely positioned control lever which comprises a pair of sonic orifice potential dividers, each divider including an input port, an output port, a bleed-off port, and a variable area orifice between the bleed-off port and the output port, said input ports of the potential dividers and opposite sides of said air actuator piston being connected to a source of sonic air, said control lever having movable means for coacting with the variable orifice of one of said potential dividers to vary the pressure at its output port, said air actuator having a movable member coacting with the variable area orifice of said other potential divider to vary the pressure at its output port, a force balance device connected to the output ports of said potential dividers to compare and translate the relative output pressures into proportioned movement, a pilot valve mechanically connected to said force balance device and pneumatically connected to opposite sides of said air actuator piston for selectively bleeding air from either side responsive to the force balance device for causing a pressure differential across the piston and movement thereof, whereby actuation of said control lever effects actuation of said air actuator.

2. A pneumatic displacement amplifier for controlling an air actuator having a piston therein by a remotely positioned control lever which comprises a pair of sonic orifice potential dividers, each divider including an input port, an output port, a bleed-off port, and a variable orifice between the bleed-off port and the output port, said input ports of the potential dividers and opposite sides of said air actuator piston being connected to a source of sonic air, said control lever having a movable member for coacting with the variable orifice of one of said potential dividers to vary the pressure at its output port, said air actuator having a movable member coacting with the variable orifice of said other potential divider to vary the pressure at its output port, a pressure responsive diaphragm pneumatically connected on one side to the output port of one of said potential dividers and on the other side to the output port of the other potential divider, a pilot valve mechanically connected to said diaphragm and pneumatically connected to opposite sides of said air actuator piston for selectively bleeding air from either side responsive to the positioning of the diaphragm for causing a pressure differential across the piston and movement thereof, whereby actuation of said control lever effects actuation of said air actuator.

3. A pneumatic displacement amplifier for controlling an air actuator having relatively movable casing and piston members by a remotely positioned control lever which comprises a pair of sonic orifice potential dividers, each divider including an input port, an output port, a bleed-off port, a fixed orifice between said input and output ports, and a variable orifice between the output and bleed-off ports, said input ports of the potential divider and opposite sides of the actuator piston member being connected to a source of sonic air, said control lever having a movable member for coacting with the variable orifice of one of said potential dividers to vary the pressure at its output port, said air actuator having a movable member coacting with the variable orifice of said other potential divider to vary the pressure at its output port, a pressure responsive diaphragm pneumatically connected on one side to the output port of one of said potential dividers and on the other side to the output port of the other potential divider, a pilot valve mechanically connected to said diaphragm and pneumatically connected to opposite sides of said actuator piston member for selectively bleeding air from either side responsive to the positioning of the diaphragm for causing a pressure differential across the piston member and relative movement between the casing and piston members, whereby actuation of said control lever effects actuation of said air actuator.

References Cited in the file of this patent

UNITED STATES PATENTS

| | | |
|---|---|---|
| 2,273,171 | Bennett | Feb. 17, 1942 |
| 2,503,397 | Le Valley | Apr. 11, 1950 |
| 2,570,624 | Wyckoff | Oct. 9, 1951 |
| 2,575,085 | Alyea | Nov. 13, 1951 |
| 2,775,231 | Silver | Dec. 25, 1956 |
| 2,814,487 | Medkeff | Nov. 26, 1957 |

FOREIGN PATENTS

| | | |
|---|---|---|
| 423,676 | Germany | Jan. 8, 1926 |